F. S. MARTIN.
LAMINATED STRUCTURE.
APPLICATION FILED FEB. 3, 1910.
1,150,049. Patented Aug. 17, 1915.
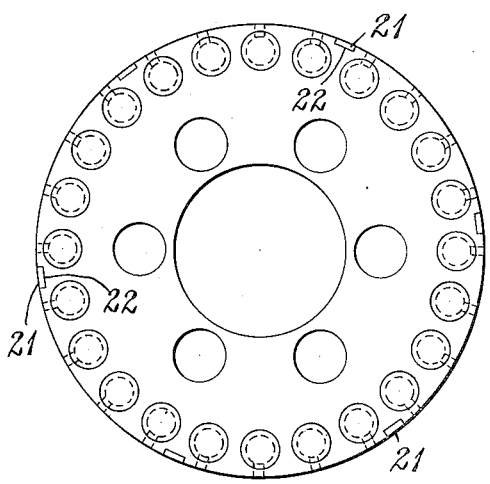
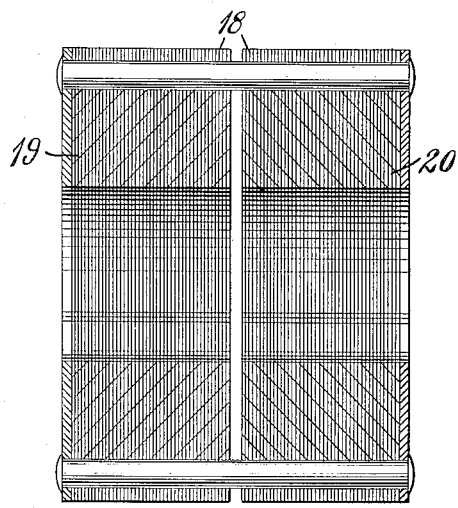
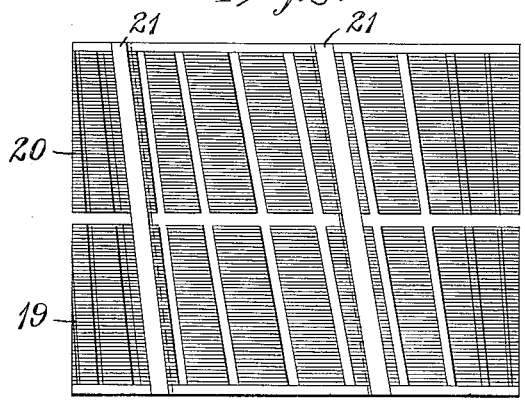
WITNESSES:
Fred H. Miller
INVENTOR
Frederick S. Martin
BY
ATTORNEY

UNITED STATES PATENT OFFICE.

FREDERICK S. MARTIN, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

LAMINATED STRUCTURE.

1,150,049.  Specification of Letters Patent.  Patented Aug. 17, 1915.

Application filed February 3, 1910. Serial No. 541,822.

*To all whom it may concern:*

Be it known that I, FREDERICK S. MARTIN, a citizen of the United States, and a resident of Edgewood Park, in the county of Allegheny and State of Pennsylvania, have invented a new and useful Improvement in Laminated Structures, of which the following is a specification.

My invention relates to laminated metal structures and it has special reference to the laminated core members of dynamo-electric machines, transformers and other electrical apparatus.

The object of my invention is to provide a novel core structure and a simple and effective method of constructing laminated core members whereby the relative displacement of the plates or punchings of which laminated structures are composed, may be prevented and the usual clamping frames omitted.

Magnetizable core structures in which alternating magnetic fluxes are produced are ordinarily laminated, *i. e.*, they are built up of thin plates or punchings in order to minimize the magnetization losses, and such structures have heretofore been supported by frames which served to clamp the plates together. The mechanical and magnetic forces exerted upon a structure of this kind tend to displace certain of the laminæ and to introduce various disturbances. For example, the air gap of a dynamo-electric machine may be materially altered by reason of the displacement of a few core laminæ.

According to my present invention, I provide a core member possessing important features and a method of constructing such members which consists in assembling notched plates so as to produce a series of grooves, which are preferably oblique to the plane of the laminæ, placing strips of metal of the same composition in the grooves and welding the strips to the plates whereby the plates are firmly secured together and are held against relative displacement.

Figures 1, 2 and 3 of the accompanying drawing are, respectively, an end elevation, a longitudinal section and a plan view of the secondary member of an induction motor that embodies, and is constructed in accordance with, my invention.

My invention is intended and adapted for use in connection with any laminated structure, whether stationary or rotatable, but, since its applicability and functions will be readily understood from a single disclosure, I have selected, as an example, the rotor of an induction motor comprising a plurality of ring laminæ 18 which are assembled in two groups 19 and 20, the plates of each group being securely held together and the groups themselves being spaced apart, by metal strips 21 that are located in grooves formed by notches 22 in the individual laminæ and are welded in position therein.

The laminæ may be so assembled that the grooves in the outer surface of the structure, provided by the notches 22, are perpendicular to the planes of the laminæ or are oblique relative thereto, (see Fig. 3) as desired.

I claim as my invention:

1. A core structure comprising a plurality of magnetizable plates disposed side by side and retaining strips of like material embedded in said structure and welded to each of the plates.

2. A core structure comprising a plurality of magnetizable metal plates disposed side by side and retaining strips transversely disposed with reference to said plates and embedded in and welded to said plates.

3. A core structure for electrical apparatus comprising a plurality of similar magnetizable plates disposed side by side and strips of like material obliquely disposed and embedded in and welded to said plates.

4. The method of constructing laminated bodies that consists in assembling a series of notched plates so as to provide grooves in the surface of the assembled structure and welding a metal reinforcement into the grooves.

5. The method of constructing laminated bodies that consists in assembling a series of notched plates so as to provide grooves in the surface of the assembled structure, placing metal strips or rods in the grooves and welding said strips or rods to the plates.

6. A core structure comprising a plurality of magnetizable metal plates disposed side by side and severally provided on their outer peripheries with a plurality of notches to form continuous grooves and retaining strips of like material embedded in said grooves and united to each of the said plates.

7. A core structure comprising a plurality of magnetizable metal plates disposed side by side and severally provided on their outer peripheries with a plurality of notches to form continuous grooves obliquely disposed with reference to said plates and retaining strips of like material embedded in said grooves and united to each of said plates.

In testimony whereof, I have hereunto subscribed my name this 26th day of Jan., 1910.

FREDERICK S. MARTIN.

Witnesses:
   H. C. SIMPSON,
   B. B. HINES.